United States Patent [19]

Haferl

[11] 4,429,257
[45] Jan. 31, 1984

[54] VARIABLE HORIZONTAL DEFLECTION CIRCUIT CAPABLE OF PROVIDING EAST-WEST PINCUSHION CORRECTION

[75] Inventor: Peter E. Haferl, Adliswil, Switzerland

[73] Assignee: RCA Corporation, New York, N.Y.

[21] Appl. No.: 428,238

[22] Filed: Sep. 29, 1982

[30] Foreign Application Priority Data

Apr. 23, 1982 [GB] United Kingdom ............... 8211833

[51] Int. Cl.³ ............................................. H01J 29/56
[52] U.S. Cl. ................................................... 315/371
[58] Field of Search ....................... 315/371, 370, 408

[56] References Cited

U.S. PATENT DOCUMENTS

| | | | |
|---|---|---|---|
| 3,879,636 | 4/1975 | Lamoureux | 315/371 |
| 3,906,305 | 9/1975 | Nillesen | 315/399 |
| 4,140,949 | 2/1979 | Terry | 315/371 |
| 4,182,978 | 1/1980 | Boekhorst | 315/371 |
| 4,225,809 | 9/1980 | Ogawa et al. | 315/371 |

OTHER PUBLICATIONS

"Chassis CTC101 Series", File 1979 C7, (p. 1 and pp. 41–43).
RCA Television Workshop-20, "Servicing the CTC 99 and 101 Color Chassis," copyright 1979 (pp. 1, 3, 65–67).

Primary Examiner—Theodore M. Blum
Attorney, Agent, or Firm—E. M. Whitacre; P. J. Rasmussen; Joseph Laks

[57] ABSTRACT

A controllable switch operated at the horizontal deflection rate is coupled to a horizontal deflection winding to generate scanning current during a trace interval of a deflection cycle. A deflection retrace capacitor forms a retrace resonant circuit with the deflection winding during the retrace interval. A supply inductance such as a winding of a horizontal output transformer is coupled either conductively or magnetically to a source of supply energy. A second capacitor is coupled to the supply inductance and to the controllable switch and forms a second resonant circuit with the supply inductance within the retrace interval to generate a pulse voltage. The pulse voltage energizes a load circuit such as the ultor high voltage circuit. A modulation inductance is coupled to a source of modulation signals and to the deflection winding and supplies a modulation current to the retrace resonant circuit to modulate the amplitude of the scanning current without modulating the amplitude of the supply inductance pulse voltage. The modulation may occur at a vertical rate to provide east-west pincushion distortion correction.

16 Claims, 10 Drawing Figures

VARIABLE HORIZONTAL DEFLECTION CIRCUIT CAPABLE OF PROVIDING EAST-WEST PINCUSHION CORRECTION

This invention relates to a deflection circuit in which the amplitude of the deflection current may be varied over a relatively wide range without changing the high voltage amplitude or the deflection retrace time. Modulation of the deflection current amplitude is desired for such purposes as east-west pincushion distortion correction, picture width adjustment, or similar applications.

General disadvantages of known east-west correction circuits are that they consume a relatively large amount of power, impose restrictions on the design of certain linearity correction circuits, or produce undesirable retrace time modulation. In addition, some east-west correction circuits require additional components serially coupled in the deflection current path. This series connection complicates the design of linearity correction circuits that require a grounded "S"-shaping capacitor for proper circuit operation.

The inventive arrangements to be described generally avoid such disadvantages. In accordance with an aspect of the invention, a controllable switch operated at a deflection rate, is coupled to a deflection winding to generate scanning current in the winding during a trace interval of a deflection cycle. A deflection retrace capacitance forms a deflection retrace resonant circuit with the deflection winding during a retrace interval. A supply inductance is coupled to a second capacitance and to the controllable switch to form a second resonant circuit within the retrace inverval to generate a pulse voltage that energizes a load circuit. During the retrace interval, the two resonant circuits are substantially decoupled from each other at the deflection retrace and higher frequencies. This decoupling avoids undesirable interaction of the two circuits.

In an embodiment of the invention, the decoupling of the two resonant circuits is accomplished by means of a relatively large valued inductive impedance interposed between the resonant two circuits within the retrace interval. During the trace interval, the controllable switch shunts current from the impedance away from the deflection winding and the supply inducance.

In according with another aspect of the invention, east-west pincushion distortion correction is also provided by coupling the impedance to a source of modulation current that is varied at a vertical rate. During the retrace interval, energy is supplied to the retrace resonant circuit in a manner that is controlled by the amount of modulation current being provided by the modulation source. By varying the modulation current at a vertical rate in a parabolic manner, the energy supplied to the retrace resonant circuit is also varied at a vertical rate. The peak current flowing in the deflection winding at the beginning of trace also varies at a vertical rate, in a parabolic manner, to achieve east-west pincushion distortion correction.

Figure 1:
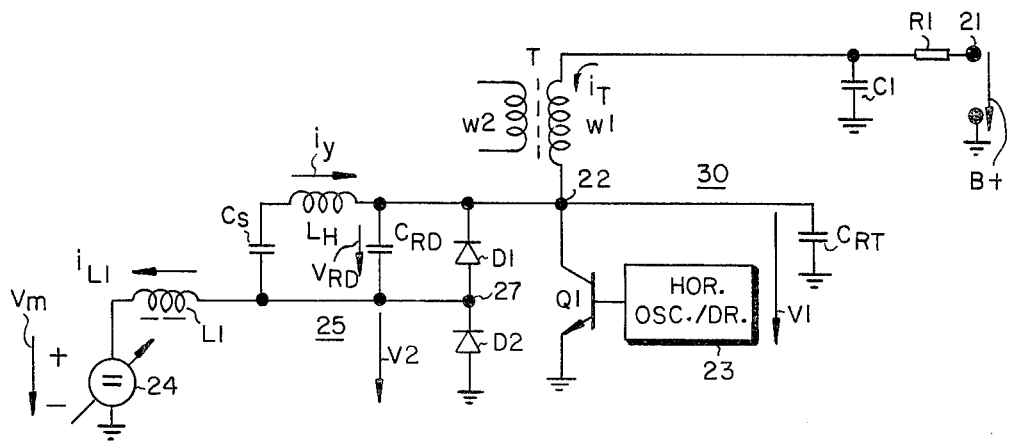
FIG. 1 illustrates a deflection circuit with amplitude control of the scanning current in accordance with the invention.

In FIG. 1, a source of regulated B+ direct voltage, developed between a terminal 21 and ground, is coupled through a resistor R1 and filtered by a capacitor C1 to a first terminal of a winding w1 of a horizontal output transformer T. The other terminal of winding w1 is coupled to a junction terminal 22.

A horizontal output transistor Q1 has its collector to emitter path coupled between terminal 22 and ground. Paralleling transistor Q1 is the series arrangement of two rectifiers, diodes D1 and D2. Coupled between the anode and cathode electrodes of diode D1 is the arrangement of a horizontal deflection winding $L_H$ and an S-shaping or trace capacitor $C_s$. A deflection retrace capacitor $C_{RD}$ is coupled across the series arrangement of horizontal deflection winding $L_H$ and trace capacitor $C_s$. A second retrace capacitor $C_{RT}$ is provided for forming a resonant circuit 30 with winding w1 of transformer T. Capacitor $C_{RT}$ is coupled between terminal 22 and ground. Coupled between the bottom plate of trace capacitor $C_s$ and ground is the series arrangement of a relatively high impedance, choke L1 and a controllable source 24 of direct voltage $V_m$.

Consider operation of the power supply and horizontal deflection circuit of FIG. 1 when controllable voltage source 24 assumes some positive direct voltage $V_m$, relative to ground, of magnitude less than the magnitude of the B+ voltage. The waveforms of FIGS. 3a–3e then apply.

Figures 2, 3, 4:
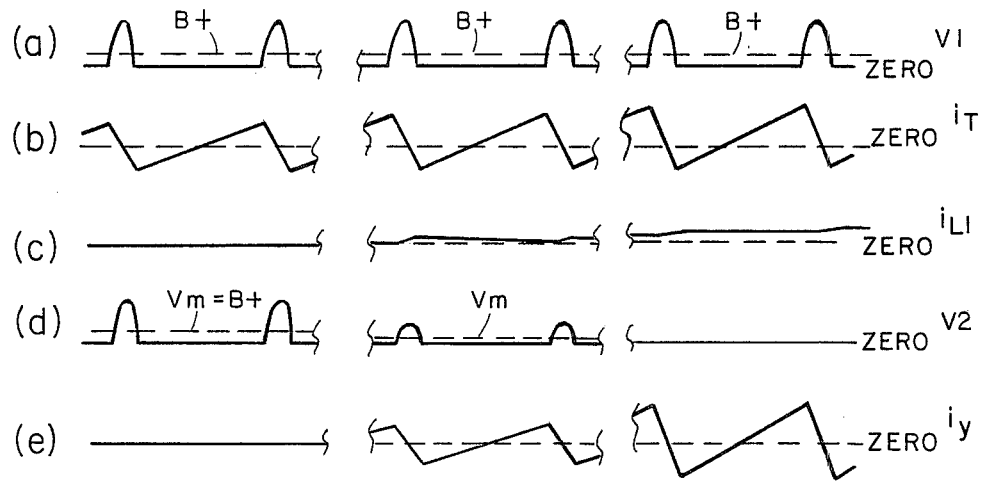
FIGS. 2–4 illustrate waveforms associated with the operation of the circuit of FIG. 1.

During the beginning portion of the horizontal trace interval, diode D1 is conducting to enable the trace voltage developed across trace capacitor $C_s$ to be applied across horizontal deflection winding $L_H$. As illustrated in FIG. 3e, with the trace voltage being applied across horizontal deflection winding $L_H$, the horizontal scanning current $i_y$ is a negative but positive going sawtooth waveform.

During the beginning portions of trace, diode D2 is also conducting, bringing the voltage at terminal 22 to ground reference voltage. The regulated B+ voltage is therefor being applied across winding w1 of horizontal output transformer T, producing the positive going sawtooth current $i_T$, as illustrated in FIG. 3b. With diode D2 conducting, the voltage developed by controllable voltage source 24 is applied across choke inductor L1 to develop the shallow sawtooth current $i_{L1}$, illustrated in FIG. 3c.

To enable positive currents $i_y$ and $i_T$ to flow, horizontal oscillator and driver 23 forward biases horizontal output transistor Q1 at some instant prior to the center of the horizontal trace interval. During the latter portions of the horizontal trace interval, positive horizontal scanning current $i_y$ flows from the right side terminal of horizontal deflection winding $L_H$ through horizontal output transistor Q1, thru diode D2, to the bottom terminal of trace capacitor $C_s$. Diode D1 becomes reversed biased when horizontal output transistor Q1 conducts forward collector current. The positive current $i_T$ in winding w1 or horizontal output transformer T flows to ground through horizontal output transistor Q1.

To initiate the horizontal retrace interval, horizontal oscillator and driver 23 applies a reverse biasing signal to the base of horizontal output transistor Q1 to cut off forward collector conduction shortly thereafter. With horizontal output transistor Q1 cut off, horizontal deflection winding $L_H$ forms a retrace resonant circuit 25 with deflection retrace capacitor $C_{RD}$ to develop a retrace pulse voltage $V_{RD}$.

Similarly upon cutoff of horizontal output transistor Q1, winding W1 of horizontal output transformer T forms the second resonant circuit 30 with the second retrace capacitor $C_{RT}$. The value of retrace capacitor $C_{RT}$ relative to the effective inductance value exhibited by winding w1 is such that the resonant frequency of the resonant circuit 30 is near or at the deflection retrace resonant frequency.

The pulse voltage developed across transformer retrace capacitor $C_{RT}$ is the voltage V1 illustrated in FIG. 3a. A similar, AC, pulse voltage is developed across winding w1 of horizontal output transformer T. This pulse voltage is transformer coupled to the other windings of the transformer, collectively illustrated in FIG. 1 as a single winding w2. The transformed pulse voltages, after suitable rectification and filtering, energize various television receiver load circuits, not illustrated in FIG. 1. The amplitude of the pulse voltage V1 and of the pulse voltage developed across winding w1 is related to the magnitude of the B+ voltage. Thus by regulating the B+ voltage, these pulse voltages are also regulated.

The amplitude of the horizontal scanning current $i_y$ and thus the amplitude of the retrace pulse voltage $V_{RD}$ is a function of the average value of the trace voltage developed across the plates of trace capacitor $C_S$. Because no voltage having a direct voltage component may be developed across an inductance, the average value of the trace voltage assumes a value equal to the difference between the B+ direct voltage and the direct voltage $V_m$. By varying the magnitude of the controllable voltage $V_m$ developed by source 24, the average trace voltage and thus peak scanning current can be concurrently varied.

For example, when the modulation voltage $V_m$ equals the B+ voltage, the current $i_{L1}$ in choke L1 is substantially zero, as illustrated in FIG. 2c. As a result, no current from winding w1 of horizontal output transformer T flows into deflection retrace resonant circuit 25. No energy from the B+ voltage supply can be transferred to maintain current in the deflection winding $L_H$. The deflection current $i_y$ therefore equals zero, as illustrated in FIG. 2e.

The waveforms of FIGS. 3a-3e illustrate the case where the modulating voltage $V_m$ is adjusted to have some magnitude less than the magnitude of the B+ voltage. The modulation current $i_{L1}$ is illustrated in FIG. 3c. During retrace, the current $i_{L1}$ flow into inductor L1 via deflection retrace capacitor $C_{RD}$. The resulting additional charge on capacitor $C_{RD}$ is transferred, during retrace, into the horizontal deflection winding $L_H$, to replenish resistive losses occurring during each deflection cycle. Because the modulation voltage $V_m$ is reduced in magnitude compared to its magnitude for the case of the waveforms of FIGS. 2a-2e, the average trace voltage, equal to the difference between the B+ voltage and the modulation voltage $V_m$, is greater in magnitude. The amplitude of the deflection current $i_y$ is increased from zero of FIG. 2e to some nonzero value of FIG. 3e. The deflection retrace pulse voltage $V_{RD}$, equal to the voltage V1 less V2, is also increased to some nonzero amplitude.

A further decrease in the modulation voltage $V_m$ to zero, wherein modulation voltage source 24 becomes the functional equivalent of a short circuit, results in the production of the waveforms of FIGS. 4a-4e. The deflection current $i_y$, in this situation, has reached its maximum amplitude. Because the amplitude of the deflection current $i_y$ is increased in FIG. 4e compared to FIG. 3e, the resistive losses incurred in the deflection winding $L_H$ is also increased. Thus the average value of the modulation current $i_{L1}$ is also increased as illustrated in FIG. 4c. Since the current $i_{L1}$ during retrace is derived from the current $i_T$ flowing in winding w1 of hoirzontal output transformer T, the positive peak value of the transformer winding current $i_T$ is increased with an increase in average value of the current $i_{L1}$.

Inductor L1 is in-circuit with deflection retrace resonant circuit 25 and transformer retrace resonant circuit 30 during substantially all of the deflection retrace interval. As a result, the circuit impedance coupled to deflection retrace resonant circuit 25 does not change and no significant deflection retrace time modulation occurs. It should also be noted that the voltage V1 developed at terminal 22 of flyback transformer winding w1 remains unchanged as the modulation voltage $V_m$ is varied. Thus ultor voltage and other DC voltages, derived by rectification and filtering the voltages developed across secondary windings of horizontal output transformer T, such as winding w2, are not affected by modulation of the horizontal scanning current $i_y$.

By using two retrace capacitors, a first retrace capacitor $C_{RD}$, for the deflection retrace resonant circuit 25, and a second retrace capacitor $C_{RT}$ for the transformer resonant circuit 30, the energy flow during retrace into the deflection retrace resonant circuit 25 can be independently controlled without affecting the amplitude of the pulse voltage V1 developed by transformer retrace resonant circuit 30. With the relatively high impedance choke L1 connected in the path of current flowing from winding w1 of horizontal output transformer T to the deflection retrace resonant circuit 25, the two resonant circuits 25 and 30 are substantially decoupled at the deflection retrace or higher frequencies. Thus, any modulation of the pulse voltage V1 due to loading variations by the load circuits energized thereby does not result in undesirable modulation of the deflection retrace pulse voltage $V_{RD}$.

During retrace, the effect of capacitor $C_S$ can be neglected because its capacity is much higher than that of capacitor $C_R$. Thus, resonant circuit 25 comprises the parallel connection of deflection winding $L_H$ and deflection retrace capacitor $C_R$. Such a circuit exhibits a high impedance at its resonant frequency and a low impedance at other frequencies. Because circuit 25 is driven by a high impedance, inductor L1, circuit 25 acts as a filter. The impedance of circuit 25 is high only at the deflection retrace frequency (44 kHz). Therefore, all voltages generated by horizontal output transformer T with frequencies substantially different than the deflection retrace frequency will appear across inductor L1 due to the impedance of inductor L1 being much higher than the impedance of deflection retrace resonant circuit 25 at these different frequencies.

By connecting choke L1 between ground and the bottom plate of deflection retrace capacitor $C_{RD}$ at terminal 27, deflection retrace resonant circuit 25 is permitted to float above ground potential during the retrace interval. Thus, during retrace, the voltage at the top plate of retrace capacitor $C_{RD}$, at terminal 22, equals the sum of the deflection retrace pulse voltage $V_{RD}$ and the voltage V2 developed between terminal 27 and ground. This floating arrangement results in the aforementioned disconnecting or decoupling the two resonant circuits 25 and 30 during retrace at frequencies equal to and above the deflection retrace frequency.

Figure 5:
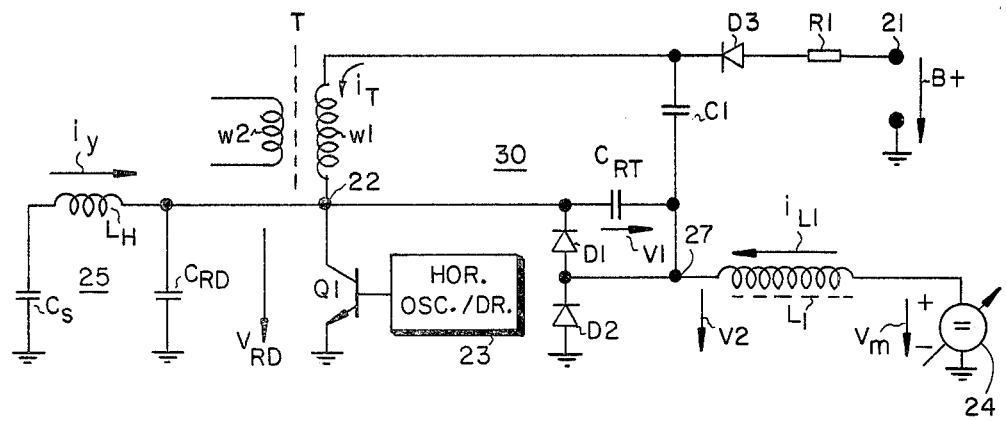
FIG. 5 illustrates a different embodiment of a deflection circuit with amplitude control of the scanning current in accordance with the invention.

FIG. 5 illustrates another embodiment of the invention wherein the trace capacitor $C_S$ is grounded as is the deflection retrace resonant circuit 25. Elements of the circuits of FIGS. 1 and 5 identified the same function in a similar manner or represent similar quantities. In the power supply and modulated deflection circuit of FIG. 5, inductor L1 is coupled to the junction of diodes D1 and D2 at terminal 27. The transformer retrace capacitor $C_{RT}$, instead of being coupled between terminal 22 and ground, is now coupled in FIG. 5 between terminal 22 and the left side terminal of inductor L1 at terminal 27. In such an arrangement, the transformer resonant circuit 30 formed by winding w1 and transformer retrace capacitor $C_{RT}$ is maintained floating above ground potential during its resonant retrace interval.

The arrangement of FIG. 5 has the advantage of using a grounded trace capacitor $C_S$. Such an arrangement is required by certain linearity correction circuits, such as described in U.S. patent application Ser. No. 363,516, filed Mar. 30, 1982, entitled LINEARITY CORRECTED HORIZONTAL DEFLECTION CIRCUIT, by P. E. Haferl. The circuits of FIGS. 1 and 5 have the common feature that inductor L1 functions as a high impedance to high frequency currents that flow between the two resonant circuits 25 and 30.

Figures 6, 7, 8:
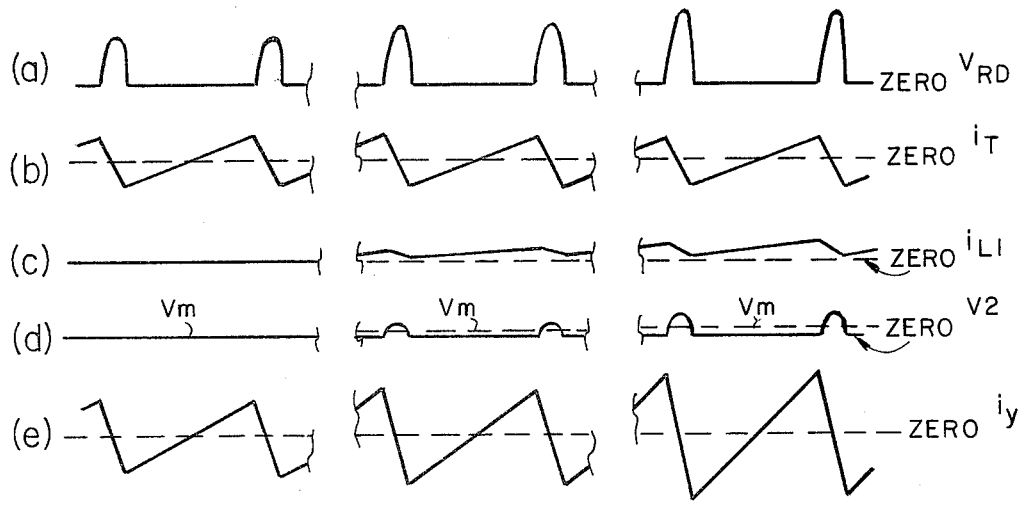
FIGS. 6–8 illustrate waveforms associated with the operation of the circuit of FIG. 5.

Amplitude modulation of the horizontal scanning current $i_y$ is provided in FIG. 5 in a manner similar to the way it is provided in FIG. 1. FIGS. 6a–6e illustrate the situation where the modulation voltage $V_m$ of FIG. 5 is zero. As a result, the current $i_{L1}$ of FIG. 6c is also zero, as is the voltage V2 between terminal 27 and ground. With zero current flowing in inductor L1, the circuit path to ground through inductor L1 and source 24 is in effect an open-circuit. The deflection retrace pulse voltage $V_{RD}$ has an amplitude that is determined solely by the regulated B+ voltage; similarly, the deflection current $i_y$ has an amplitude that is determined solely by the B+ voltage.

FIGS. 7a–7e illustrate the situation wherein the modulation voltage $V_m$ is increased to some magnitude above zero. The current $i_{L1}$ flows during horizontal trace through diode D1, and also through horizontal output transistor Q1 when it conducts forward collector current. During horizontal retrace, inductor L1 is serially connected with the transformer retrace resonant circuit 30. The pulse voltage V2 is applied to the cathode of diode D3 via a large valued filter capacitor C1 to cut off conduction in the diode during retrace. The deflection retrace voltage $V_{RD}$ is the sum of the voltage V2 and the retrace pulse voltage V1' developed across transformer retrace capacitor $C_{RT}$. The average value of the voltage V2 equals the magnitude of the modulation voltage $V_m$. Thus, the average value of the retrace pulse voltage $V_{RD}$ and the amplitude of the scanning current $i_y$ increase with increasing modulation voltage $V_m$. Because the B+ voltage is regulated, the voltage V1' remains unchanged in average value as well as amplitude.

A further increase of the current $i_{L1}$ due to a further increase in the modulation voltage $V_m$ produces the waveforms of FIGS. 8a–8e. The amplitude of the pulse voltage V2 increases and consequently so do the amplitudes of the deflection retrace pulse voltage $V_{RD}$ and the deflection current $i_y$ as illustrated in FIGS. 8a and 8e. It should be noted that the current $i_m$ in winding w1 of horizontal output transformer T remains unchanged as modulation voltage $V_m$ changes because the current $i_{L1}$ during retrace flows to deflection retrace resonant circuit 25 through retrace capacitor $C_{RT}$ rather than through winding w1.

When comparing similarities and differences in the operation of the circuits of FIGS. 1 and 5, it should be mentioned that the scanning current $i_y$ of the circuit of FIG. 1 may be varied from approximatly zero to a value determined by the B+ voltage; whereas the scanning current $i_y$ of the circuit of FIG. 5 may be varied from the value determined by the B+ voltage to a value determined by the maximum magnitude that the modulation voltage $V_m$ is permitted to attain. One limiting factor on the maximum magnitude of the voltage $V_m$ is the maximum voltage stress that is permitted to be imposed between the collector and the emitter electrodes of the horizontal output transistor Q1. The pulse voltage applied to the collector of the horizontal output transistor Q1 is constant in the circuit of FIG. 1 but varies in the circuit of FIG. 5. The current $i_T$ varies in the circuit of FIG. 1 but remains constant in the circuit of FIG. 5. In the circuits of both FIGS. 1 and 5, if the modulation voltage $V_m$ is varied in amplitude at a vertical rate in the parabolic manner, the amplitude of the horizontal scanning current $i_y$ is modulated in a similar fashion to provide east-west pincushion correction.

Figure 9:
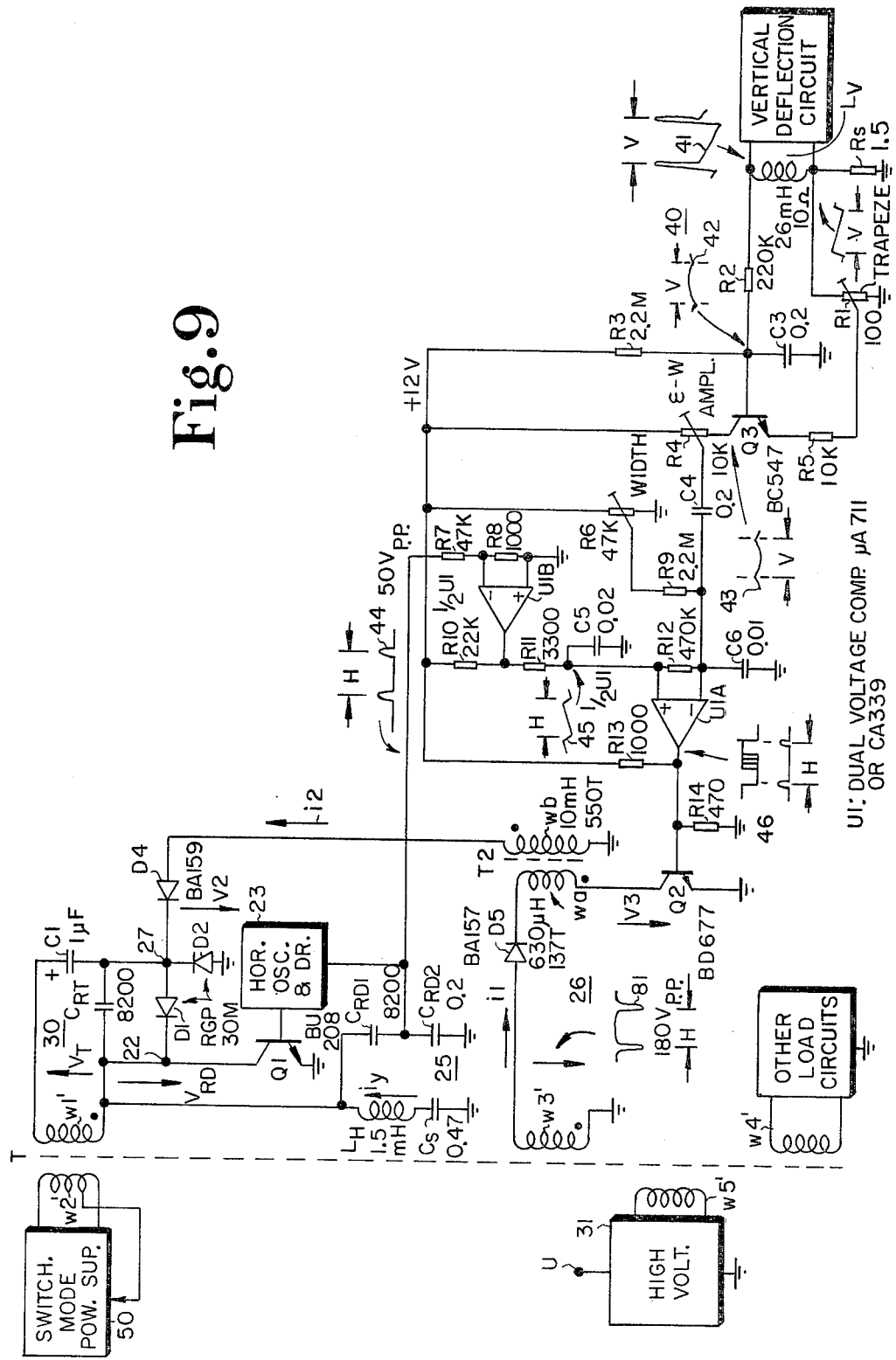
FIG. 9 illustrates a deflection circuit with east-west pincushion correction in accordance with the invention.

FIG. 9 illustrates a power supply and modulated deflection circuit embodying the invention wherein the primary winding of the horizontal output transformer is coupled to a switched mode power supply and the horizontal deflection circuit is coupled to a secondary winding of the transformer. Elements in FIGS. 1, 5 and 9 identified the same function in a similar manner or represent similar quantities.

In FIG. 9 a winding w2' of a horizontal output transformer T is connected to a switched mode power supply 50 such as the single conversion system (SICOS) power supply described in U.S. patent application Ser. No. 333,610, filed Dec. 22, 1981, by P. E. Haferl, entitled REGULATED DEFLECTION CIRCUIT.

The arrangement of FIG. 9 like the arrangement of FIG. 5 includes a grounded S-shaping capacitor $C_s$ to enable the use of a linearity circuit, not illustrated in FIG. 9, requiring such an arrangement. In FIG. 9, a modulation circuit 26 provides for east-west pincushion distortion correction, while maintaining the amplitude of the pulse voltage $V_T$ across winding w1' regulated by the switched mode supply. The deflection resonant circuit 25 and the transformer resonant circuit 30 are each tuned to the deflection retrace frequency. When a SICOS type switched mode power supply is used, the effective inductance exhibited by winding w1' is relatively large and as such the retrace capacitances $C_{RT}$ and $C_{RD1}$, $_{RD2}$ associated with the two resonant circuits are selected to be approximately the same value.

During the horizontal trace interval, transformer retrace capacitor $C_{RT}$ and DC blocking capacitor C1 are connected to ground via the conducting diode D2 or the conducting diode D1 and the conducting horizontal output transistor Q1. During the first half of the horizontal retrace interval, each of the transformer resonant circuit 30 and the deflection retrace resonant circuit 25 produces a pulse voltage $V_T$ or $V_{RD}$ by transferring inductive stored energy to capacitive stored energy stored in the respective retrace capacitor $C_{RT}$ or $C_{RD1,RD2}$. This energy is subsequently returned to the respective inductance w1' or $L_H$ during the second half of the retrace interval.

The pulse voltage $V_T$ is sampled by way of a tap on winding w2' of horizontal output transformer T and applied to switched mode power supply 50 to regulate the amplitude of the pulse voltage under mains supply voltage and load changes. Energy is transferred from switched mode power supply 50 during retrace through windings w2' and w1' to transformer resonant circuit 30 and other retrace driven load circuits coupled to other secondary windings w3'–w5'.

As an example, the resistive losses incurred by horizontal deflection winding $L_H$ are replenished each horizontal retrace interval via diode D2 from the energy transferred to the transformer resonant circuit 30. As another example, the regulated pulse voltage $V_T$ produced in winding w1' of horizontal output transformer T is stepped up by high voltage winding w5' to energize the high voltage ultor circuit 31 and produce a regulated direct ultor voltage at an ultor terminal U.

Assume now a current i2 of some given magnitude passes through winding $w_b$ of a transformer T2 of modulation circuit 26. During the horizontal trace interval, the current i2 flows from ground through winding $w_b$, and a diode D4 to terminal 27 which is at ground potential due to the conduction of of diode D1 and either diode D2 or horizontal output transistor Q1. During the horizontal retrace interval transistor Q1 is cut off. If current i₂ is greater than the current flowing through diode D2, D2 is also cut off. The current i₂ now passes into the transformer resonant circuit 30 and from there into the deflection retrace circuit 25, replenishing losses incurred in the deflection retrace resonant circuit. The difference in voltage between the deflection retrace pulse voltage $V_{RD}$ and the sum of the regulated transformer pulse voltage $V_T$ and the voltage across capacitor C1 appears across diode D2 as the pulse voltage V2.

Figure 10:
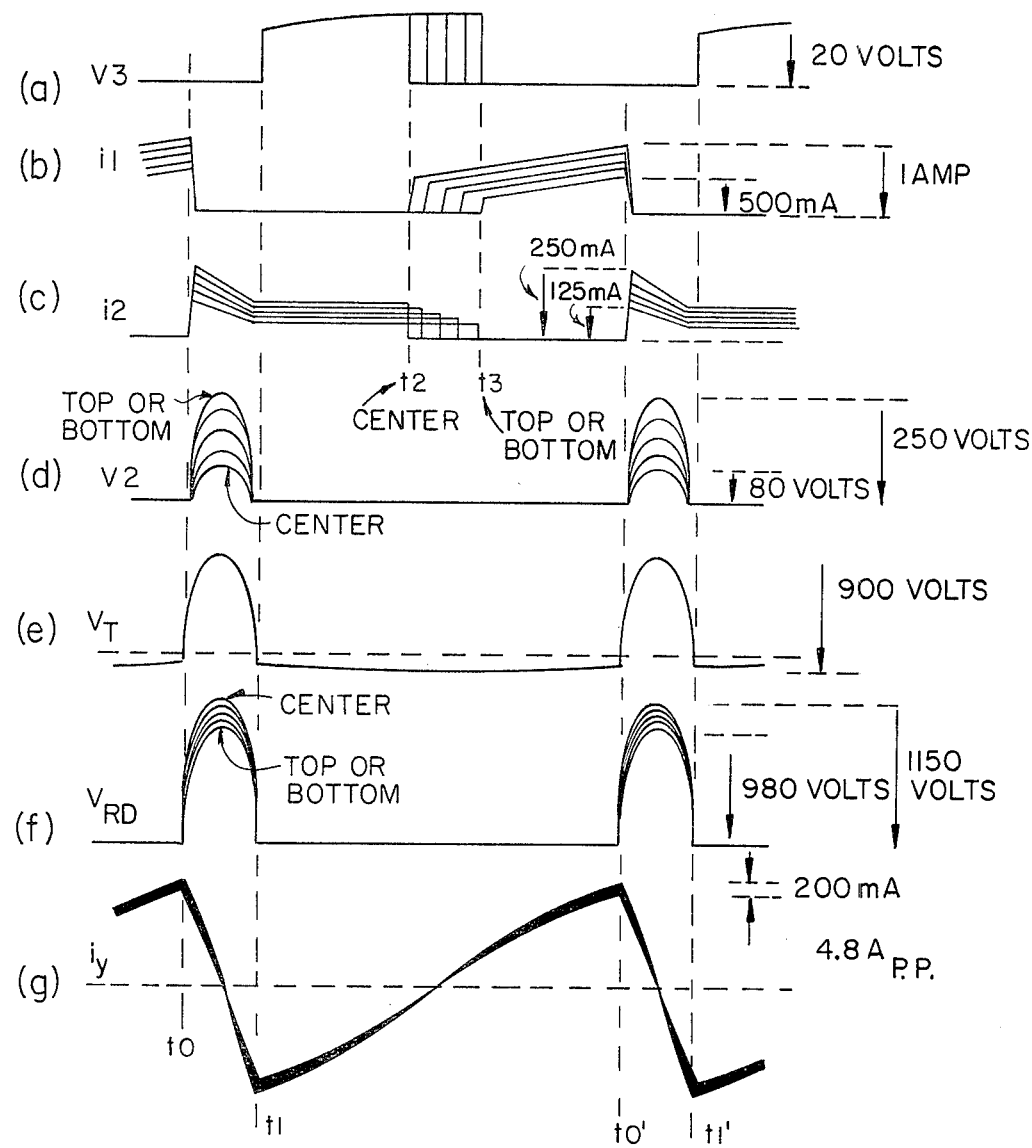
FIG. 10 illustrates waveforms associated with the operation of the circuit of claim 9.

During retrace, the interval t0–t1 or t0'–t1' of FIGS. 10a–10 g, the current i2 decreases. If the inductance exhibited by winding $w_b$ of transformer T2 is sufficiently large, the current i2 does not decrease to zero at the end of the horizontal retrace interval. Thus winding $w_b$ is coupled via the transformer resonant circuit 30 to the deflection retrace circuit 25 during substantially the entire horizontal retrace interval. Changes in the amplitude of the current i2 therefor will not produce any significant retrace time modulation of the deflection retrace pulse voltage $V_{RD}$.

Because two separate resonant circuits 25 and 30 are involved in producing the two pulse voltages $V_{RD}$ and $V_T$, the waveshape of the pulse voltage $V_T$ may tend to vary with beam current loading on ultor terminal U or loading variations on windings w4' without producing concurrent variation in waveshape of the deflection retrace pulse voltage $V_{RD}$. The relatively large inductance of winding $w_b$ of transformer T2 acts as a filter to prevent such concurrent modulation or distortion of the retrace pulse voltage. Because of this fact, the horizontal synchronizing pulse 44, used for the phasing of horizontal oscillator and driver 23 may be advantageously taken from the capacitive voltage divider $C_{RD1}$, $C_{RD2}$ rather than from a winding of horizontal output transformer T.

In FIGS. 10a–10g the envelope of waveforms indicates the vertical rate waveform variations produced by modulation circuit 26 needed to correct east-west pincushion distortion of the raster.

Modulation circuit 26 generates a varying current i2 to currently vary the deflection retrace pulse amplitude and thus to concurrently vary the amplitude of the horizontal scanning current $i_y$. A switching transistor Q2, operated in a flyback converter mode with rectifier D4, controls the amplitude of the current i2. As illustrated in FIG. 10a by the collector voltage V3 of transistor Q2, transistor Q2 is conducting prior to the beginning of the horizontal retrace interval, prior to time t0 or t0'. The voltage V3 is zero prior to time t0 and the current i1 flowing in winding $w_a$ of transformer T2 is near its maximum value, as illustrated in FIG. 10b.

At time t0 the voltage 81 across winding w3' of horizontal output transformer T reverses polarity and cuts off diode D5. The current i1 in winding $w_a$ rapidly decays to zero near time t0, as illustrated in FIG. 10b. A reverse biasing voltage 46 produced during retrace by the negative going switching waveform at the output of a voltage comparator UIA is applied to the base of switching transistor Q2. It should be noted that the current i1 in winding $w_a$ of transformer T2 and in the collector of switching transistor Q2 is cut off by the reverse biasing of diode D5 due to the voltage polarity reversal across winding w3' of horizontal transformer T rather than being due to any reverse bias applied to the base of switching transistor Q2. Thus, the storage time delay of the turnoff of switching transistor Q2 is negligible and is not a factor in the cutoff of current i1.

To maintain flux continuity in the core of transformer T2 near time 50, the current i2, illustrated in FIG. 10c, rapidly builds up. This current during horizontal retrace flows from winding $w_b$ through diode D4 into the transformer retrace capacitor $C_{RT}$. The voltage V2, illustrated in FIG. 10d, is therefore also a pulse voltage developed within the retrace interval that is then applied to winding $w_b$ of transformer T2. Application of this pulse voltage to winding $w_b$ causes the current i2 to decrease during horizontal retrace. As illustrated in FIG. 10c the current i2 does not however decrease all the way to zero prior to the end of horizontal retrace. Had the current i2 decreased to zero significantly prior to that time, inductance $w_b$ would have been disconnected from the two resonant circuits 25 and 30 during a substantial portion of horizontal retrace, and an unacceptable retrace time modulation would have resulted.

It should be noted that the voltage V2 begins to increase a short time after time t0 and begins to derease to ground reference voltage a short time before time t1. Such behavior occurs because of the turn off time delay of diode D2 at time t0 when a reverse biasing voltage is applied to the diode and because of the conduction of diode D2 just prior to time t1 to transfer some energy from transformer resonant circuit 30 to deflection retrace resonant circuit 25.

At time t1 the beginning of the subsequent horizontal trace interval, switching transistor Q2 is in cutoff. The voltage V3 increases to the trace voltage magnitude being developed across horizontal output transformer winding w3'. The dotted terminal of winding $w_b$ of transformer T2 is coupled to terminal 27 due to the conduction of diode D4. Terminal 27 is at ground potential due to the conduction of diode D2 just prior to time t1. The current i2 therefore circulates at a substantially constant amplitude, as illsutrated in FIG. 10c, after diode D2 begins conducting, until switching transistor Q2 is turned on at some instant within the interval t2–t3. The time t2 corresponds to the center of vertical scan where a large amplitude horizontal deflection current is required to compensate for east-west pincushion distortion. The time t3 corresponds to the top or bottom of vertical scan where a smaller amplitude horizontal deflection current is required.

When switching transistor Q2 is turned on, the positive trace voltage developed across horizontal output transformer winding w3' is applied across winding $w_a$ of transformer T2. This voltage is coupled by transformer action to winding $w_b$ such that the dotted terminal of winding $w_b$ becomes negative and cuts off diode D4. The current i2 in winding $w_b$ collapses to zero. The stored energy in transformer T2 induces a voltage in winding $w_a$ to produce the rapid increase of current i1 as illustrated in FIG. 10b, beginning at some instant within the interval t2–t3.

From the instant that switching transistor Q2 is turned on until the end of the horizontal trace interval at time t0', energy is again stored in transformer T2 by an increasing current i1 in winding $w_a$, as illustrated in FIG. 10b. This energy is transferred via winding $w_b$ into transformer resonant circuit 30 and into deflection retrace resonant circuit 25 during the retrace interval t0'–t1'.

To provide east-west pincushion correction, switching transistor Q2 of modulation circuit 26 is pulse width modulated at a vertical rate in a parabolic manner by the pulse width control circuit 40 of FIG. 9. The vertical sawtooth voltage 41 developed across the vertical deflection winding $L_V$ is integrated to obtain a vertical parabola signal 42 across integrating capacitor C3. The parabola is inverted and amplified by a transistor Q3. Some vertical sawtooth voltage is applied to the emitter of transistor Q3 via the trapeze control resistor R1 to compensate for a slight tilt to the parabola signal 43.

The amplitude of the symmetrical, inverted parabola signal 43 developed at the collector of transistor Q3 is adjusted by a resistor R4 and applied via the DC blocking capacitor C4 to the inverting input terminal of voltage comparator U1A. The DC level at this input terminal can be shifted slightly with respect to the DC level at the noninverting input terminal by width control resistor R6. A voltage comparator U1B is controlled by horizontal retrace pulses 44 to produce a horizontal rate sawtooth signal 45 across a capacitor C5. By comparing this horizontal sawtooth signal with the vertical parabola signal applied to the non-inverting input terminal of comparator U1A, comparator U1A produces at its output the required pulse width modulated switching signal 46 that is applied to the base of switching transistor Q2.

Increasing the amplitude of the parabolic signal 43 by adjusting amplitude control resistor R4 results in a wider interval t2–t3 of FIGS. 10a–10c, producing an increasing amount of pincushion correction. Decreasing the DC voltage level difference between the inverting and non-inverting terminal of comparator U1A by adjustment of width control resistor R6 results in a time shift of the interval t2–t3 to the left in FIGS. 10a–10c, thereby producing an increased amplitude to the horizontal scanning current $i_y$ and consequently producing a wider raster.

The circuit of FIG. 9 and the waveforms of FIG. 10 are illustrative of operation in a television receiver with a 110 degree, S4 color picture tube operated at a 24 kilovolt ultor voltage.

What is claimed is:

1. A power supply and modulated deflection circuit, comprising:
   a deflection winding;
   switching means coupled to said deflection winding and operated at a deflection rate to generate scanning current in said deflection winding during a trace interval of a deflection cycle;
   a deflection retrace capacitance for forming a deflection retrace resonant circuit with said deflection winding to produce a retrace pulse voltage during a retrace interval of said deflection cycle;
   a source of supply energy;
   a supply inductance coupled to said source;
   a second capacitance coupled to said supply inductance and to said switching means for forming a second resonant circuit with said supply inductance within said retrace interval to generate a pulse voltage;
   a load circuit energized by said pulse voltage;
   an impedance interposed during said retrace interval in a current path between said deflection retrace and second resonant circuits to isolate said deflection retrace resonant circuit from modulation of said retrace pulse voltage by loading variations on the pulse voltage generated by said second resonant circuit; and
   a source of modulation current coupled to said impedance for producing modulation of said scanning current as said modulation current varies.

2. A power supply and modulated deflection circuit according to claim 1 wherein said deflection retrace resonant circuit is coupled to said second resonant circuit within said retrace interval only by way of said impedance, which impedance acts to decouple the two resonant circuits at frequencies higher than said deflection retrace frequency.

3. A power supply and modulated deflection circuit according to claim 2 wherein said supply inductance comprises a flyback transformer having a first winding coupled to said source of supply energy and a high voltage winding across which is developed the pulse voltage generated by said second resonant circuit, wherein said load circuit comprises a high voltage circuit for deriving from said pulse voltage developed across said high voltage winding an ultor voltage at an ultor terminal, and wherein said impedance functions as a filter to prevent variations of beam current loading on said ultor terminal from producing distortion of said deflection retrace pulse voltage.

4. A power supply and modulated deflection circuit according to claim 2 wherein a resonant frequency of said second resonant circuit is at a near said deflection retrace frequency.

5. A power supply and modulated deflection circuit according to claim 1 wherein said impedance comprises a modulation inductance that exhibits a relatively high value at said deflection retrace or high frequencies.

6. A power supply and modulated deflection circuit according to claim 5 wherein a resonant frequency of said second resonant circuit is at or near said deflection retrace frequency.

7. A power supply and modulated deflection circuit according to claim 5 including a trace capacitance coupled to said deflection winding for applying a trace voltage thereto, and wherein the amplitude of said scanning current varies as said trace voltage varies, and wherein said impedance couples said modulation current to said deflection retrace resonant circuit for varying said trace voltage as said modulation current varies.

8. A power supply and modulated deflection circuit according to claims 1 or 5 wherein said deflection circuit comprises a horizontal deflection circuit and including a source of vertical rate signals coupled to said source of modulation current for varying said modulation current at a vertical rate for providing an east-west pincushion corrected scanning current waveform.

9. A power supply and modulated deflection circuit according to claims 1 or 5 wherein said impedance comprises a first winding coupled to said source of modulation current and a second winding magnetically coupled to said first winding and interposed between said deflection retrace and second resonant circuits during said deflection retrace interval.

10. A power supply and modulated deflection circuit according to claim 9 wherein said source of modulation current comprises a source of voltage coupled to the first winding of said impedance and to a first controllable switch, said controllable switch being responsive to a control signal for pulse modulating the switching thereof.

11. A power supply and modulated deflection circuit according to claim 10 including a rectifier coupled to the second winding of said impedance to produce a flyback converter mode of operation of the controllable switch.

12. A power supply and modulated deflection circuit according to claim 11 wherein said deflection circuit and deflection winding comprise respectively a horizontal deflection circuit and a horizontal deflection winding and including means for developing a vertical rate signal and means coupled to said first controllable switch and responsive to said vertical rate signal for developing said control signal as a control pulse that is modulated at a vertical rate and that is applied to said first controllable switch to produce modulation of said scanning current in a manner that provides east-west pincushion correction.

13. A power supply and modulated deflection circuit according to claim 5 wherein said deflection rate operated switching means, deflection retrace resonant circuit and second resonant circuit are coupled to a common junction terminal.

14. A power supply and modulated deflection circuit according to claim 13 wherein said deflection rate operated switching means comprises a deflection output device having a main current conduction path switched at said deflection rate and two rectifiers coupled in series, with the series arrangement paralleling said main current conduction path of said output device, said impedance being coupled to a junction terminal in common with the two rectifiers.

15. A power supply and deflection circuit according to claim 1, wherein said supply inductance comprises a pulse transformer having a first winding coupled to said second capacitance to generate said pulse voltage across said first winding and having a high voltage winding for stepping up said pulse voltage, said load circuit including an ultor terminal and a high voltage circuit coupled to said ultor terminal and to said high voltage winding to develop an ultor voltage at said ultor terminal.

16. A power supply and deflection circuit according to claim 15 wherein variations in current loading on said ultor terminal tend to distort said pulse voltage and wherein said impedance enables the deflection retrace pulse voltage developed by said deflection retrace resonant circuit to be substantially free of any tendency to become distorted with said variations in current loading.

* * * * *

UNITED STATES PATENT AND TRADEMARK OFFICE
CERTIFICATE OF CORRECTION

PATENT NO. : 4,429,257

DATED : January 31, 1984

INVENTOR(S) : Peter Eduard Haferl

It is certified that error appears in the above-identified patent and that said Letters Patent is hereby corrected as shown below:

Column 1, line 46, that portion reading "according" should read --accordance--. Column 2, line 7, that portion reading "claim" should read --FIGURE--. Column 8, line 51, that portion reading "derease" should read --decrease--. Column 11, line 16, that portion reading "betweeen" should read --between--. Column 12, line 21, delete "Claim 1," and substitute therefore --Claims 1, 5, 7, 13 and 14,--.

Signed and Sealed this

Twenty-seventh Day of November 1984

[SEAL]

Attest:

GERALD J. MOSSINGHOFF

Attesting Officer

Commissioner of Patents and Trademarks